3,331,994
METHOD OF COATING SEMICONDUCTOR WITH TUNGSTEN-CONTAINING GLASS AND ARTICLE
Clifford Kile, Jr., Lansdale, Pa., assignor to Philco-Ford Corporation, a corporation of Delaware
Filed Sept. 26, 1963, Ser. No. 311,868
8 Claims. (Cl. 317—234)

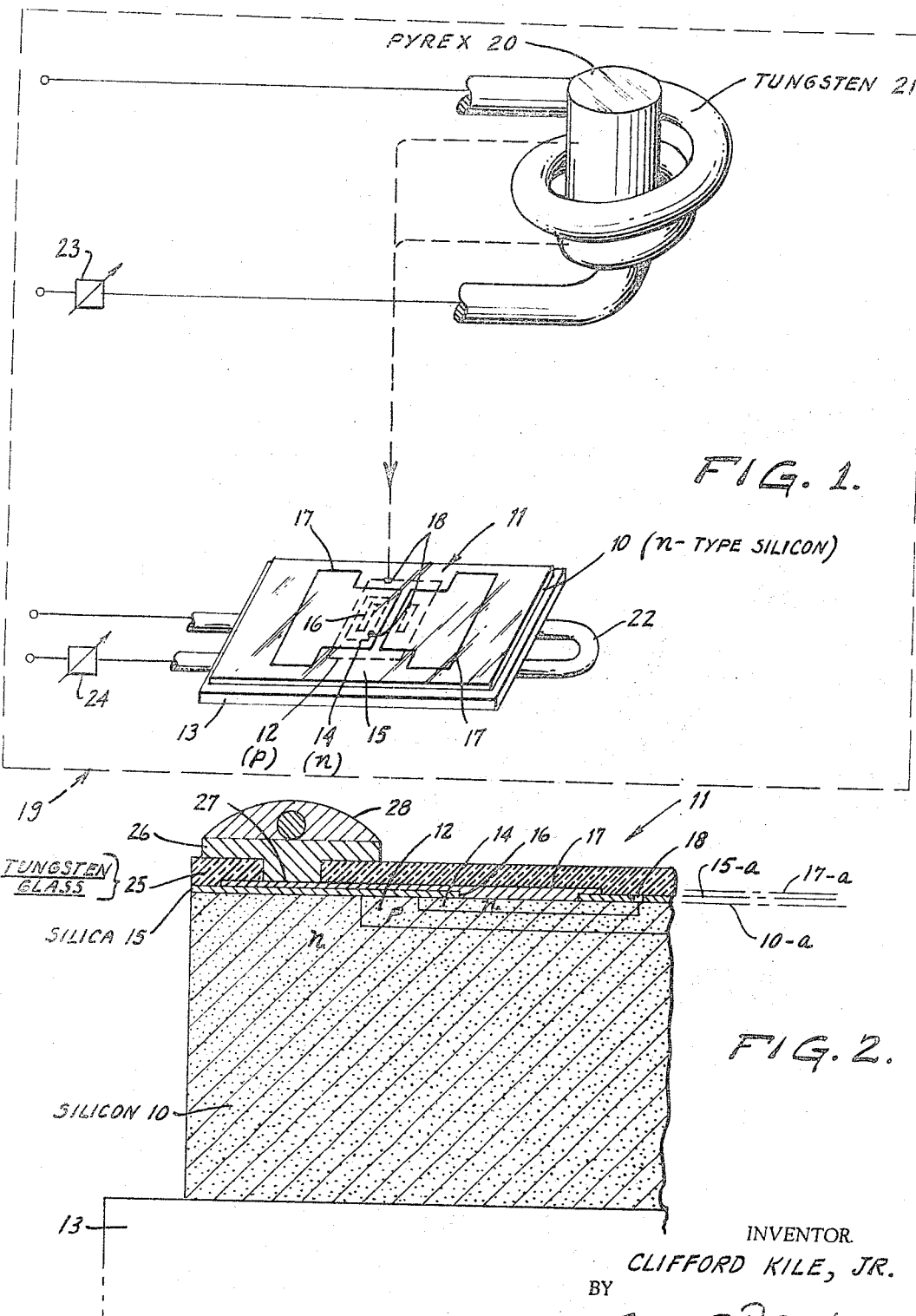

This invention relates to glassed semiconductors and to a method of making them. It is a primary object of this invention to establish and maintain a hermetic glass seal as a coating adherent to a semiconductor surface, in order to protect the semiconductor from access of harmful impurities. A further important object is, to dimension the seal coating so as to minimize capacitive coupling between the semiconductor and metal films spaced therefrom by such coating.

The best results thus far achieved, with respect to such sealing and spacing, were obatined when a hard, adherent coat of high-silica borosilicate glass was provided on a silicon semiconductor. Even with such glass, however, the most reliable sealing effect required in certain cases was not achieved. High temperatures must be applied to the semiconductor for forming the glass coat, causing thermal expansion of the silicon and high-silica glass, and although such expansions are rather similar, significant thermomechanical stresses were heretofore set up in the glass-silicon unit incident to subsequent cooling of the semiconductor unit. "Crazing," that is, microscopic or submicroscopic cracking of the glass was then encountered, followed by complete or partial loss of previously established sealing effects.

These troubles were encountered mainly when the glass cover was built up to the relatively substantial thickness of a few microns, which is desirable to obtain suitable sealing of the semiconductor junctions, and which is also needed for suitable spacing of the metallic contactors from the silicon body. Particularly when wafers comprising some scores or hundreds of transistor or diode units were coated, the thermo-mechanical mismtach of high-silica glass and crystalline silicon was sufficient to cause microscopic cracking of the weaker element, that is, usually of the glass. Even on individual glassed silicon chips, cracking of glass was encountered. A very thin glass or quartz coat appeared to tolerate mechanical stress or strain, but had inferior sealing effect due to the presence of pin-holes, present in the glass from the very beginning; also of course it was impossible to achieve satisfactory contact spacing by such a very thin coat.

I have discovered that these difficulties are overcome by a coating technique in which, in lieu of the ordinary high-silica borosilicate glass, the condensate of a tungsten-containing vapor of such glass is used for coating the junctions of the silicon thin-film semiconductor device, and that particularly excellent results can be obtained with a tungsten-containing vapor of that high-silica borosilicate glass which is made by Corning Glass Works, of Corning, N.Y., sold under the trademark Pyrex, and which comprises, by weight, approximately 80% silica, 14% boric oxide and minor amounts or traces of soda, alumina, etc., the best proportion of tungsten being of the order of 16 to 20% of said glass. I have thereby produced a highly compatible glass coating on a silicon chip or wafer, with substantially improved matching of thermal coefficients of expansion of silicon crystal and high silica glass. The exact reason for this improvement, obtained by the presence of tungsten, is not presently known; in fact it is not even entirely clear whether the tungsten is present as such, in the coating, or present therein as part of an oxide or other compound. However, the new technique is successful and clearly understood.

This new technique will be more fully described, and as far as possible explained, in connection with the drawing appended hereto, wherein FIGURE 1 is a schematic, perspective, and greatly enlarged view of an arrangement desirably employed in performing the new method, while FIGURE 2 is a cross sectional view, on a still larger scale, this latter view being taken after completion of the device by glassing and additional method steps. In both figures, as pointed out in the description which follows, different scales are used for different elements and dimensions, in order to facilitate presentation of important features.

FIGURE 1 indicates how the new glassing method is applied (broken lines) to an n-type semiconductor chip 10 of crystalline silicon. The chip has first been provided with thin-film electrode structure 11, including for instance p-type base layer 12 in a top surface of the chip; a bottom surface of the chip has been bonded to a collector and support member 13; and an n-type emitter 14 has been formed within the p-type layer 12. Electrode structure 11 has been covered and "passivated" by film 15 of silica ($SiO_2$, quartz), grown directly on the silicon, and apertures 16 have been etched through this film to provide for electrically conductive film-like metal contacts 17 of the emitter and base regions.

The chip can have relatively substantial dimensions, such as a few millimeters side length and a thickness of 25 microns, but the grown silica film 15 is necessarily extremely thin; it is typically built up only to a thickness such as one-half micron. As a result, it is not a fully hermetic enclosure for electrode structure 11, particularly not after required fabricating operations, such as baking at a temperature of 300° C. The film is likely to have pin-holes, including submicroscopic cracks. Some such holes, as shown at 18, are likely to overlie p-n junction lines 10, 12, 14. While only two holes are illustrated and while they are shown as dots 18 of some appreciable size, there are cases where many thousands of them exist in the minute expanse of a transistor.

Even a single submicroscopic pin-hole, overlying an exposed junction line, can provide access for a molecule or atom of an unwanted impurity, which in certain cases is sufficient seriously to impair desired semiconductor operation. It is therefore necessary to provide a substantially hermetic seal, over the exposed silicon, silica and metal surfaces of the semiconductor device, shown in FIGURE 2 at 10–a, 15–a and 17–a. The new method provides such a seal.

For this purpose the new method uses a highly evacuated space 19 (FIGURE 1) wherein heat is applied to suitable glass—desirably a small piece of Pyrex glass 20—by an incandescent filament 21 of tungsten, while silicon semiconductor chip 10 is exposed to the resulting tungsten glass vapor, and to heat from a separate filament 22. The first mentioned filament 21, made of tungsten and which is shown with considerable enlargement over its actual size but on a smaller scale than chip 10, is advantageously heated to a temperature of approximately 2200° C., by passing electric current through the filament. This is done when space 19 has been evacuated to about $10^{-5}$ or $10^{-6}$ torr, while semiconductor chip 10 is advantageously held at a temperature of about 600° C., by separate heater 22. In order to maintain the indicated temperatures of filaments 21 and 22, well-known control devices can be used, which I have schematically shown at 23, 24 respectively.

I have found that the glass condensate, when produced in the described way, contains about 16 to 20% of tungsten, in addition to a major amount of silica and much smaller amounts or traces of boric oxide and other materials such as soda. It appears probable, but not certain, that the condensate, and perhaps also the vapor in space 19, comprises an oxide of tungsten (probably $WO_3$) mixed with other elements or compounds derived from the Pyrex glass; but the details, pertaining for instance to distribution of tungsten in the condensate, are presently unknown.

In any event, the new method produces a glass coating 25 (FIGURE 2) which is uniquely compatible with the silicon substrate and which can safely be built up to substantial thickness. Upper contact lands 26, larger than lower lands 17 and overlying major parts of the semiconductor surface, can then be provided, the upper and lower lands being interconnected through apertures etched through the glass. It might be noted that FIGURE 2 greatly emphasizes all vertical or thickness dimensions over the horizontal dimensions and that it deemphasizes horizontal dimenisons particularly adjacent the left-hand side. Typical, actual proportions are indicated more realitsically in FIGURE 1. I may also add that exact details relative to preferred materials are disclosed elsewhere but that in general, metal lands 17 between the glass and silica films desirably consist of triple (chromium, silver and chromium) laminations, with an overlying contact land body 26 made for instance of aluminum. Silver contacts can be used with advantage at the upper and lower surfaces of lands 17, contacting silicon 10 and land 26.

It appears that by virtue of the presence of tungsten in the glass, the matching of coefficients of thermal expansion for the crystalline silicon substrate and the high-silica glass coat is greatly improved. These coefficients become much more compatible, one with the other, at the indicated temperatures, than they were in the tests units heretofore made or proposed. This is particularly so in the presence of the grown quartz layer or film. In spite of former efforts a slight and yet significant thermal mismatch seemed to exist thus far, between the ordinary Pyrex coating and its crystalline substrate. Not even such a small or residual mismatch remains, by virtue of the tungsten glass coating provided by this invention. All pin-holes of the grown quartz layer 15 are plugged with material compatible with the semiconductor, and metal contacts 17, 26 are spaced by the aforementioned distance of several microns. This condition is then maintained, without noticeable crazing or loss of seal, upon the subsequent cooling of the coated semiconductor unit and even upon a treatment thereof which causes enormous heat shocks.

Substantially hermetic and durable sealing of the junction areas is thus achieved. In addition, appreciable separation can thus be provided, with success, between top lands 26 overlying the glass coating and the underlying structures 17 and 10. In the absence of such spacing, very undesirable capacitance effects are often encountered between underlying and overlying areas, particularly at frequencies up to billions or trillions of cycles per second as encountered when fractional millimeter waves pass through the junction structure. These capacitance effects are most simply and most effectively minimized by the use of a relatively thick tungsten glass coat 25, made possible by this invention.

Various modifications of the details described above are possible. For instance, tungsten glass layers or bodies of still greater thickness can be produced, and instead of coating an individual semiconductor unit or chip 10, a planar wafer or "mother-board" comprising numerous junction areas 11 can be glassed in space 19.

When such operations were attempted with the best glassing techniques of the prior art, the mechanical strains resulting from the residual thermal mismatch of coating and substrate materials were relatively great, and the former glass sealing techniques were correspondingly problematic. The products of the new technique, by contrast, are impressively strong. Sealed wafers have been subjected to rapid cycling, for instance between the temperatures of liquid nitrogen and boiling water. They have then been tested, with full success, to determine the absence of microscopic and submicroscopic cracks. The best semiconductor products formerly available, sealed with relatively pure borosilicate glass, were entirely unable to withstand such a test; in many of them the glass seal was already crazed by cooling down from about 600° C. to room temperature.

Modified procedures can be used to provide lower ratios of tungsten addition to glass, for instance only 4 to 8% by weight of tungsten; this can be achieved for instance by adjusting control 23 to maintain the relatively low filament temperature of about 2000° C. In this case, however, the deposited glass layer is more susceptible to the danger of thermo-mechanical strain. It is also possible to deposit a Pyrex glass condensate with a larger proportion of tungsten, for instance by raising the glass evaporating temperature of the tungsten filament to about 2400° C.; such larger tungsten content, however, conduces to the formation of a glass coating which is hard to etch for application of upper contact lands or the like. It appears that for this reason the addition of tungsten must in no case exceed about 36 to 40%.

It is possible to vary the limiting temperatures of the tungsten coil and yet to stay within the stated limitations of tungsten-glass ratios. This can be done for instance by use of lesser or greater evacuation of space 19, as may be determined from published data on vapor pressures of tungsten.

It is also possible to vary the substrate temperatures, maintained by heater control 24; however, at semiconductor temperatures in excess of about 650 or 700° C., the metal lands or contact films, for instance of triple (chromium, silver, chromium) structure, would be harmed. At still higher temperatures the grown quartz film or the semiconductor junctions could be impaired, for instance by metal alloying processes and the like. By contrast, at chip or wafer temperatures substantially below about 450° C., adequate adhesion of the glass seal has not been obtained.

I claim:

1. In the passivation of a silicon semiconductor surface: heating high-silica glass and tungsten to about 2200 degrees centigrade, in a space evacuated to about $10^{-5}$ to $10^{-6}$ torr, and condensing the resulting vapor on said semiconductor surface as a thin film to passivate said surface.

2. In a method as described in claim 1, maintaining the semiconductor at about 600 degrees centigrade during said condensing.

3. A silicon semiconductor having, adherent thereto, a body of high-silica glass containing at least about four percent of tungsten.

4. A semiconductor as described in claim 3 wherein said glass contains boric oxide and minor amounts of other materials in addition to silica and tungsten.

5. A silicon semiconductor and, as a means for passivating it, a coating thereon including a layer of high-silica borosilicate glass containing about sixteen to twenty percent of tungsten.

6. A semiconductor as described in claim 5 wherein the layer of glass is several microns thick.

7. A passivated thin-film semiconductor wafer or chip, comprising a silicon semiconductor body with a thickness of the order of 25 microns and with junctions in a surface thereof; a silica film on said surface with a thickness of the order of .5 micron; and a tungsten-containing high-silica glass coat on said film with a thickness of the order of 2 microns.

8. A wafer or chip as described in claim 7 additionally including lower metal contacts generally underlying said glass coat and upper metal contacts generally overlying it.

References Cited
UNITED STATES PATENTS 2,961,350  11/1960  Flaschen et al. _____ 117—200

FOREIGN PATENTS 882,174  7/1953  Germany.

ALFRED L. LEAVITT, *Primary Examiner.*

WILLIAM L. JARVIS, *Examiner.*